(12) United States Patent
Zuo

(10) Patent No.: US 10,769,986 B2
(45) Date of Patent: Sep. 8, 2020

(54) OLED DISPLAY DEVICE AND DRIVING METHOD THEREOF

(71) Applicant: Wuhan China Star Optoelectronics Technology Co., Ltd., Wuhan, Hubei (CN)

(72) Inventor: Qingcheng Zuo, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 133 days.

(21) Appl. No.: 15/571,024

(22) PCT Filed: Oct. 19, 2017

(86) PCT No.: PCT/CN2017/106934
§ 371 (c)(1),
(2) Date: Oct. 31, 2017

(87) PCT Pub. No.: WO2019/019435
PCT Pub. Date: Jan. 31, 2019

(65) Prior Publication Data
US 2019/0385515 A1    Dec. 19, 2019

(30) Foreign Application Priority Data
Jul. 24, 2017    (CN) .......................... 2017 1 0608578

(51) Int. Cl.
*G06T 1/00*    (2006.01)
*G09G 3/3208*    (2016.01)
(Continued)

(52) U.S. Cl.
CPC .......... *G09G 3/3208* (2013.01); *G06F 3/013* (2013.01); *G06K 9/00597* (2013.01); *G09G 2310/0264* (2013.01)

(58) Field of Classification Search
CPC ..... G06T 15/005; G06T 19/00; G06T 11/001; G06T 11/40; G06T 11/60
(Continued)

(56) References Cited

U.S. PATENT DOCUMENTS

| 2003/0095155 | A1 | 5/2003 | Johnson |
| 2004/0164935 | A1* | 8/2004 | Dedene ............... H01L 27/3218 345/75.2 |

(Continued)

FOREIGN PATENT DOCUMENTS

| CN | 102073370 | 5/2011 |
| CN | 102231255 | 11/2011 |

(Continued)

*Primary Examiner* — Gordon G Liu
(74) *Attorney, Agent, or Firm* — Hemisphere Law, PLLC; Zhigang Ma

(57) ABSTRACT

The disclosure provides an OLED display device and a driving method thereof. The OLED display device includes an OLED display module, a driving module, and a system module, and the driving module includes a display driving module and a human eye recognition module; the system module generates display data based on an image, the display driving module drives the OLED display module to display according to the data, and the human eye recognition module senses a human eye's focus area and gives feedback information to the system module; when the human eye recognition module senses the human eye's focus area, information thereof is fed back to the system module, the system module determines the focus and non-focus areas according to the information, then the display driving module turns off all or part of predetermined sub-pixels in the non-focus area. The disclosure can prolong the lifetime of the OLED display device.

4 Claims, 2 Drawing Sheets

(51) Int. Cl.
*G06F 3/01* (2006.01)
*G06K 9/00* (2006.01)

(58) Field of Classification Search
USPC .......................................................... 345/418
See application file for complete search history.

(56) References Cited

U.S. PATENT DOCUMENTS

| | | | |
|---|---|---|---|
| 2014/0340377 A1* | 11/2014 | Kishi | G09G 3/3225 345/211 |
| 2016/0267716 A1* | 9/2016 | Patel | G09G 5/395 |
| 2017/0236466 A1* | 8/2017 | Spitzer | G09G 3/2085 345/560 |

FOREIGN PATENT DOCUMENTS

| | | |
|---|---|---|
| CN | 104239585 | 12/2014 |
| CN | 104811532 | 7/2015 |
| CN | 105788527 | 7/2016 |
| GB | 2490864 | 11/2012 |

\* cited by examiner

OLED DISPLAY DEVICE AND DRIVING METHOD THEREOF

RELATED APPLICATIONS

The present application is a National Phase of International Application Number PCT/CN2017/106934, filed Oct. 19, 2017, and claims the priority of China Application No. 201710608578.9, filed Jul. 24, 2017.

FIELD OF THE DISCLOSURE

The disclosure relates to the field of OLED display devices, and more particularly to an OLED display device and a driving method thereof.

BACKGROUND

With the development of the display industry, not only the display screen is developed from the initial dot matrix to today's liquid crystal display, OLED, and the like, but also the liquid crystal display is developed from black and white display to color display; and in the field of mobile display, display size is also developed from under 1 inch to today's 5-inch, 6-inch or even larger. The deadliest problem of OLEDs in the past is lifetime, because OLEDs require R (red), G (red), and B (blue) three materials (corresponding to R, G, and B sub-pixels, respectively) to be active by current stimulation; since the degree of aging of the three kinds of materials is different, with a period of time, the brightness decline of the material having a fast decay is also fast, the screen will produce color cast, thus restricting the lifetime of the OLED display screen. The reason is that the problem of lifetime and stability of the materials such as blue material having a fast decay is technically unable to be solved, therefore how to prolong the lifetime of blue LED is a worthy research subject.

As shown in FIG. 1, FIG. 1 is a schematic diagram of the image quality requirements when the human eye is focusing. When the display module 11 is viewed by the human eye, the display module 11 may be divided into a focus area and a non-focus area according to an area where the human eye is focused, and the image quality requirement of the focus area is high, and the image quality requirement of the non-focus area is low. The division of the focus area and the non-focus area may be predetermined. In FIG. 1, the area is divided in an easier way, the area where the finger is located is a focus area, and the display module 11 is divided into a focus area and a non-focus area along the dotted line. Take a large-screen mobile phone display for example, due to the focus characteristic of the human eye itself, when we watch the large-screen mobile phone display, the part where the human eye focus is only part of the area of the display screen, rather than the entire display screen; therefore, the requirement for the display effect of the human eye non-focus area will also be much lower than the requirement for the focus area.

Referring to FIG. 2, FIG. 2 is a schematic diagram showing the relationship between the conventional OLED display module and the human eye's focus area, and the OLED display module may specifically be an OLED display screen of mobile phone, including RGB three sub-pixels. When the OLED display module 21 is viewed by the human eye, the OLED display module 21 may be divided into a focus area and a non-focus area according to an area where the human eye is focused. The division of the focus area and the non-focus area may be predetermined. In FIG. 2, the area is divided in an easier way, the upper half area of OLED display module 21 where the human eye's focus area is located is divided as a focus area, and the lower half area of OLED display module 21 is divided as a non-focus area. According to the conventional OLED display device and the driving method thereof, the conventional OLED display module 21 displays with the same image quality, thus the service life cannot be prolonged, and this needs to be improved.

SUMMARY

Accordingly, an object of the disclosure is to provide an OLED display device to prolong the service life of an OLED display device.

Another object of the disclosure is to provide a driving method of the OLED display device, to prolong the service life of the OLED display device.

In order to achieve the objects, the disclosure provides an OLED display device including an OLED display module, a driving module, and a system module, wherein the OLED display module is connected to the driving module, the driving module is connected to the system module, the driving module includes a display driving module and a human eye recognition module; the system module generates display data based on an image to be displayed, and the display driving module drives the OLED display module to display according to the display data generated by the system module, the human eye recognition module senses a human eye's focus area and gives feedback information of the human eye's focus area to the system module; when the human eye recognition module senses the human eye's focus area, information of the human eye's focus area is fed back to the system module, the system module determines the focus area and the non-focus area according to the information of the human eye's focus area, and the display driving module turns off all or part of the predetermined sub-pixels in the non-focus area when the display driving module drives the OLED display module to display.

The predetermined types of sub-pixels are sub-pixels having a relatively fast lifetime decay.

The predetermined sub-pixels are blue sub-pixels.

The sub-pixel of the predetermined type is a red sub-pixel.

The human eye recognition module is an infrared sensing module applying a human eye tracking technique.

The disclosure also provides a driving method of the OLED display device, including:

step 10: when the human eye recognition module senses the human eye's focus area, information of the human eye's focus area is fed back to the system module, the system module determines the focus area and the non-focus area according to the information of the human eye's focus area;

step 20: the display driving module turns off all or part of the predetermined sub-pixels in the non-focus area when the display driving module drives the OLED display module to display.

The predetermined types of sub-pixels are sub-pixels having a relatively fast lifetime decay.

The predetermined sub-pixels are blue sub-pixels.

The sub-pixel of the predetermined type is a red sub-pixel.

The human eye recognition module is an infrared sensing module applying a human eye tracking technique.

The disclosure also provides an OLED display device, including an OLED display module, a driving module, and a system module, wherein the OLED display module is connected to the driving module, the driving module is connected to the system module, the driving module includes a display driving module and a human eye recognition module; the system module generates display data based on an image to be displayed, and the display driving module drives the OLED display module to display according to the display data generated by the system module, the human eye recognition module senses a human eye's focus area and gives feedback information of the human eye's focus area to the system module; when the human eye recognition module senses the human eye's focus area, information of the human eye's focus area is fed back to the system module, the system module determines the focus area and the non-focus area according to the information of the human eye's focus area, and the display driving module turns off all or part of the predetermined sub-pixels in the non-focus area when the display driving module drives the OLED display module to display;

The predetermined sub-pixels are blue sub-pixels.

The human eye recognition module is an infrared sensing module applying a human eye tracking technique.

In summary, the OLED display device of the disclosure and the driving method thereof can prolong the service life of the OLED display device.

BRIEF DESCRIPTION OF THE DRAWINGS

The technical proposal of the disclosure and other advantageous effects will be apparent from the following detailed description of specific embodiments of the disclosure taken in conjunction with the accompanying drawings.

In the drawings.

DETAILED DESCRIPTION OF PREFERRED EMBODIMENTS

Figure 1:
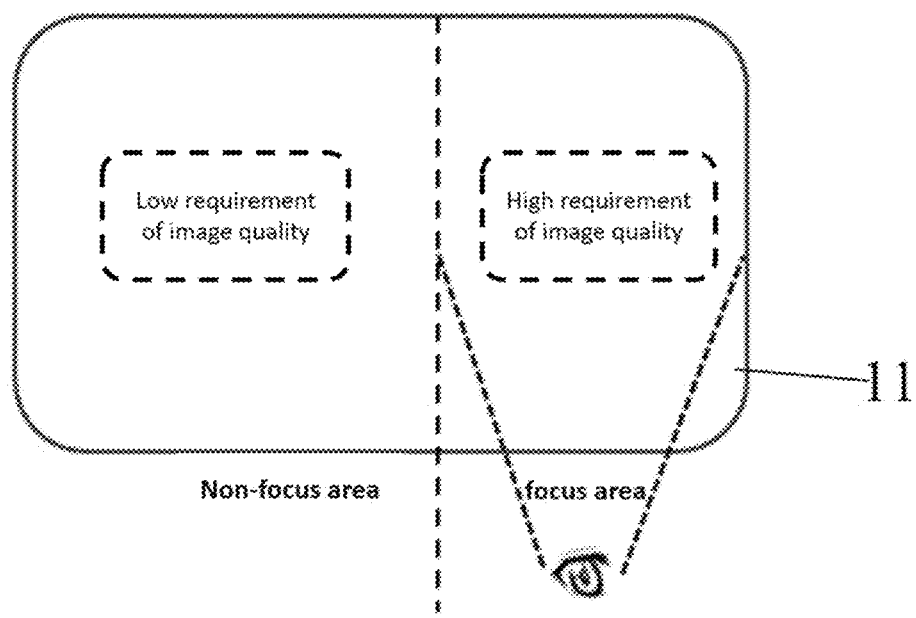
FIG. 1 is a schematic diagram of the image quality requirements when the human eye is focusing.
Figure 2:
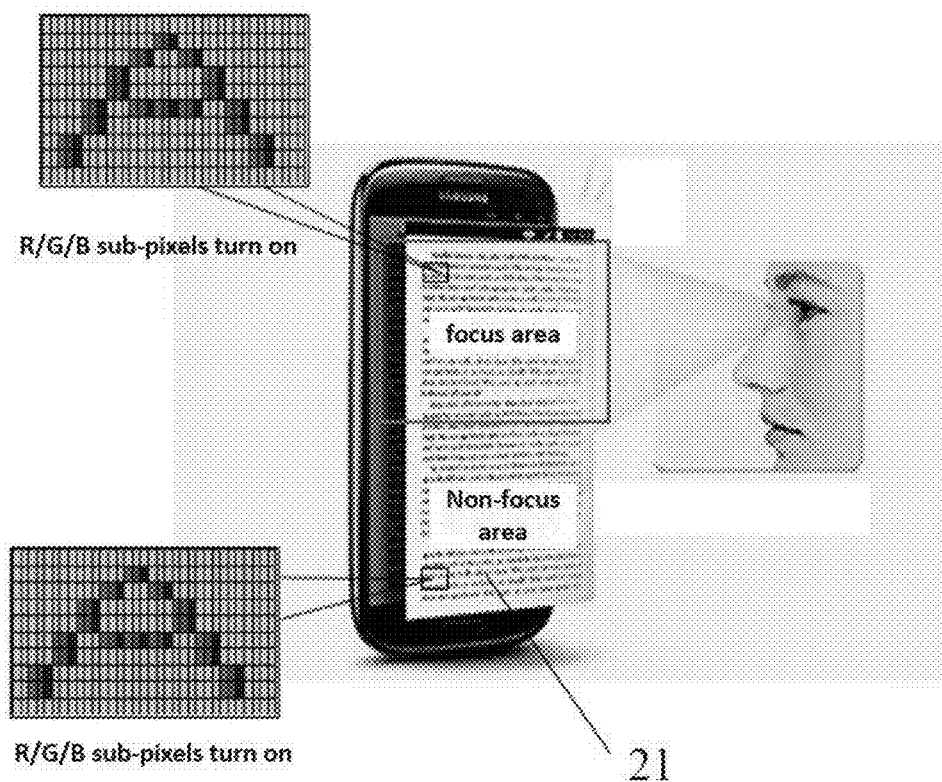
FIG. 2 is a schematic diagram showing the relationship between the conventional OLED display module and the human eye's focus area.
Figure 3:
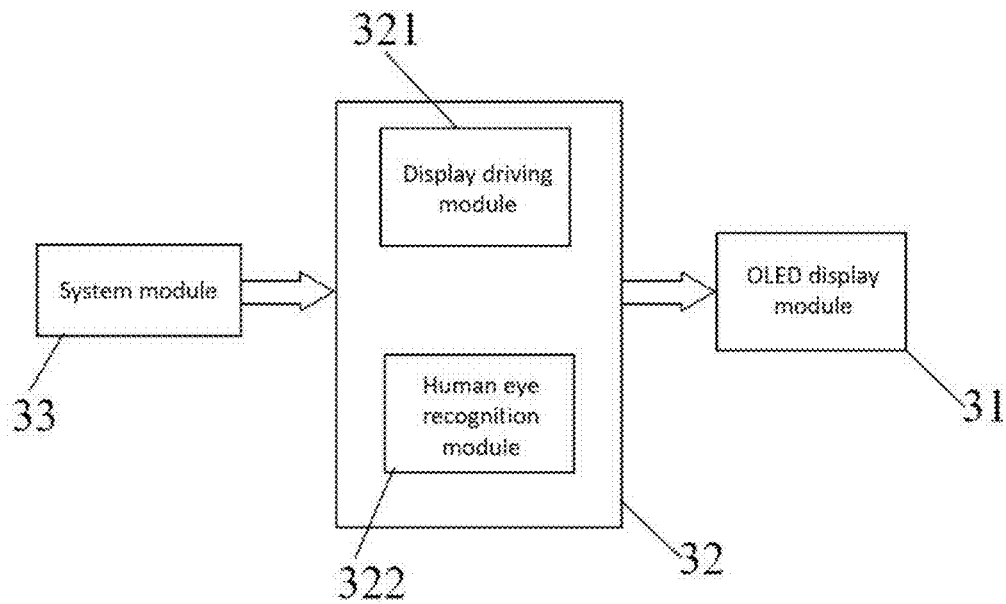
FIG. 3 is a schematic diagram of a preferred embodiment of the OLED display device of the disclosure.
Figure 4:
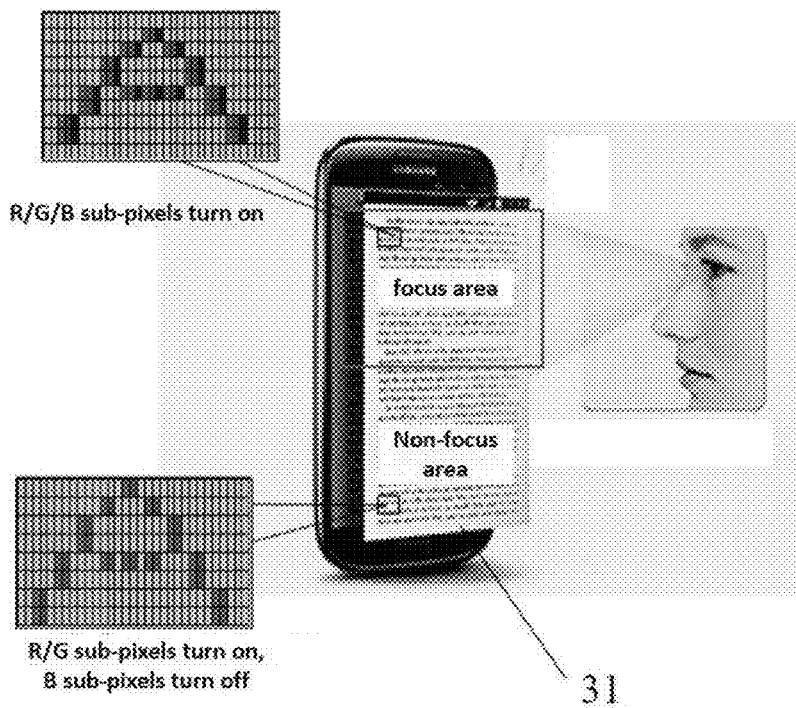
FIG. 4 is a schematic diagram showing the relationship between the OLED display module and the human eye's focus area according to a preferred embodiment of the OLED display device of the disclosure.

Referring to FIG. 3 and FIG. 4, FIG. 3 is a schematic view of a structure of an OLED display device according to a preferred embodiment of the disclosure, and FIG. 4 is a schematic diagram showing the relationship between the OLED display module and the human eye's focus area according to the preferred embodiment. The OLED display device mainly includes an OLED display module 31, wherein the OLED display module 31 is connected to the driving module 32, the driving module 32 is connected to the system module 33, the driving module 32 may include a display driving module 321 and a human eye recognition module 322; the system module 33 generates display data based on an image to be displayed, and the display driving module 321 drives the OLED display module 31 to display according to the display data generated by the system module 33, the human eye recognition module 322 senses a human eye's focus area and gives feedback information of the human eye's focus area to the system module 33; when the human eye recognition module 322 senses the human eye's focus area, information of the human eye's focus area is fed back to the system module 33, the system module 33 determines the focus area and the non-focus area according to the information of the human eye's focus area, and the display driving module 321 turns off all or part of the predetermined sub-pixels in the non-focus area when the display driving module 321 drives the OLED display module 31 to display. After determining the focus area and the non-focus area, the system module 33 may generate the display data in conjunction with the sub-pixels to be closed in the determined non-focus area, and the OLED display module 31 is driven by the display driving module 321.

Hereinafter, the present invention will be described in detail in conjunction with a mobile phone, the system module 33 may be a mobile phone system side, the human eye recognition module 322 may be an infrared sensing module applying a human eye tracking technique, or may be other human eye recognition (biometric) module capable of applying eye tracking techniques. The display module 321 may be a display chip, the OLED display module 31 may be an OLED display screen of a mobile phone, may include RGB three sub-pixels, and may be provided with elements such as an infrared sensor for human eye tracking; the mobile phone system side generates the display data corresponding to the image to be displayed, the display chip drives the OLED display screen of the mobile phone according to the display data to display the image to be displayed, when the infrared sensing module senses the human eye's focus area, the coordinates of the human eye's focus area is fed back to the mobile phone system side. In the preferred embodiment, the division of the focus area and the non-focus area may be predetermined, and the area is divided by an easier way in FIG. 4, that is, the focus area is the area where the human eyes focus, and the OLED display module 31 is divided up and down as a focus area and a non-focus area. According to the actual needs, the area may also be divided by left and right or other appropriate division method.

In operation, via the embedded infrared sensing module, the mobile phone senses the eye focus area, such as the display area of the OLED upper half screen or the display area of the lower half screen, and prolongs the service life of the overall OLED panel by closing predetermined blue LEDs (or red LEDs, etc.) within the non-focus area. As the infrared sensing module senses that the human eye focuses on the upper half area of the display screen, then when the OLED display screen shows the display data of the lower half area, all or part of the blue LEDs having a relatively fast lifetime decay are turned off, that is, the blue sub-pixels are turned off as shown in FIG. 4, or all or part of the red LEDs or other color LEDs may be turned off. As the infrared sensing module senses that the human eyes focus on the lower half area of the display screen, the upper half area of the OLED display screen is the non-focus area, then when the OLED display shows the display data of the upper half area all or part of the blue LEDs (or red LEDs, etc.) having a relatively fast lifetime decay are turned off. As the blue LEDs (or red LEDs, etc.) are turned off, the number of excitation of the blue LEDs (or red LEDs, etc.) can be reduced without affecting the normal use of the case, so as to achieve the purpose of prolonging the service life of the OLED display device.

The disclosure also provides a driving method of the OLED display device, including:

step 10: when the human eye recognition module senses the human eye's focus area, information of the human eye's focus area is fed back to the system module, the system module determines the focus area and the non-focus area according to the information of the human eye's focus area;

step 20: the display driving module turns off all or part of the predetermined sub-pixels in the non-focus area when the display driving module drives the OLED display module to display.

The predetermined sub-pixels are blue sub-pixels, simply described by taking a mobile phone as an example; the mobile phone via the embedded infrared sensing module, senses the eye focus area, such as the display area of the OLED upper half screen; As the infrared sensing module senses that the human eye focuses on the upper half area of the display screen, all of the blue LEDs having a relatively fast lifetime decay are turned off, that is, the blue sub-pixels are turned off when the OLED display screen shows the display data of the lower half of the display area. As the blue LEDs are turned off, the number of excitation of the blue LEDs can be reduced without affecting the normal use of the case, so as to achieve the purpose of prolonging the service life of the OLED display device. Similarly, as the human eyes focus from the upper half screen to the lower half screen, then the blue LEDs having a relatively fast lifetime decay are turned off when the OLED display screen shows the display data of the upper half area, thereby the number of excitation of the blue LEDs can be reduced without affecting the normal use of the case, so as to achieve the purpose of prolonging the service life of the OLED display device.

In summary, the OLED display device of the disclosure and the driving method thereof can prolong the service life of the OLED display device.

As described above, it will be apparent to those skilled in the art that various other changes and modifications may be made in accordance with the technical solutions and technical concepts of the disclosure, and all such changes and modifications are subject to be included in the scope of protection of the appended claims.

What is claimed is:

1. An OLED display device, comprising
an OLED display module,
a driving module, and
a system module;
wherein the OLED display module is connected to the driving module, the driving module is connected to the system module, and the driving module comprises a display driving module and a human eye recognition module; the system module generates display data based on an image to be displayed, the display driving module drives the OLED display module to display according to the display data generated by the system module, the human eye recognition module senses a human eye's focus area and gives feedback information of the human eye's focus area to the system module; when the human eye recognition module senses the human eye's focus area, information of the human eye's focus area is fed back to the system module, the system module determines a focus area and a non-focus area according to information of the human eye's focus area, and the display driving module turns off all or part of predetermined sub-pixels in the non-focus area when the display driving module drives the OLED display module to display;
wherein a service life of the predetermined sub-pixels in the non-focus area is lower than a service life of non-predetermined sub-pixels in the non-focus area, and the predetermined sub-pixels are red sub-pixels.

2. The OLED display device according to claim 1, wherein the human eye recognition module is an infrared sensing module applying a human eye tracking technique.

3. A driving method of the OLED display device according to claim 1, comprising:
step 10: when the human eye recognition module senses the human eye's focus area, information of the human eye's focus area is fed back to the system module, the system module determines the focus area and the non-focus area according to the information of the human eye's focus area;
step 20: the display driving module turns off all or part of the predetermined sub-pixels in the non-focus area when the display driving module drives the OLED display module to display;
wherein a service life of the predetermined sub-pixels in the non-focus area is lower than a service life of non-predetermined sub-pixels in the non-focus area, and predetermined sub-pixels are red sub-pixels.

4. The driving method of the OLED display device according to claim 3, wherein the human eye recognition module is an infrared sensing module applying a human eye tracking technique.

* * * * *